D. B. WILLIAMS.
NUT SHELLER AND SEPARATOR.
APPLICATION FILED NOV. 23, 1915.

1,317,342.

Patented Sept. 30, 1919.
3 SHEETS—SHEET 1.

Witnesses

Inventor
DICK B. WILLIAMS
By
Attorney

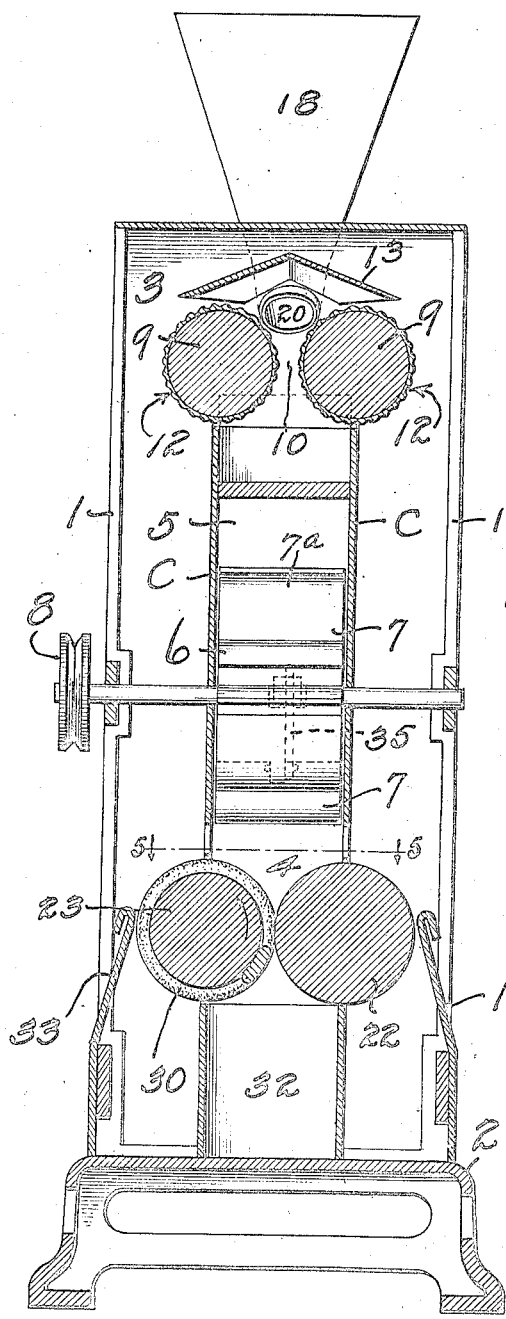
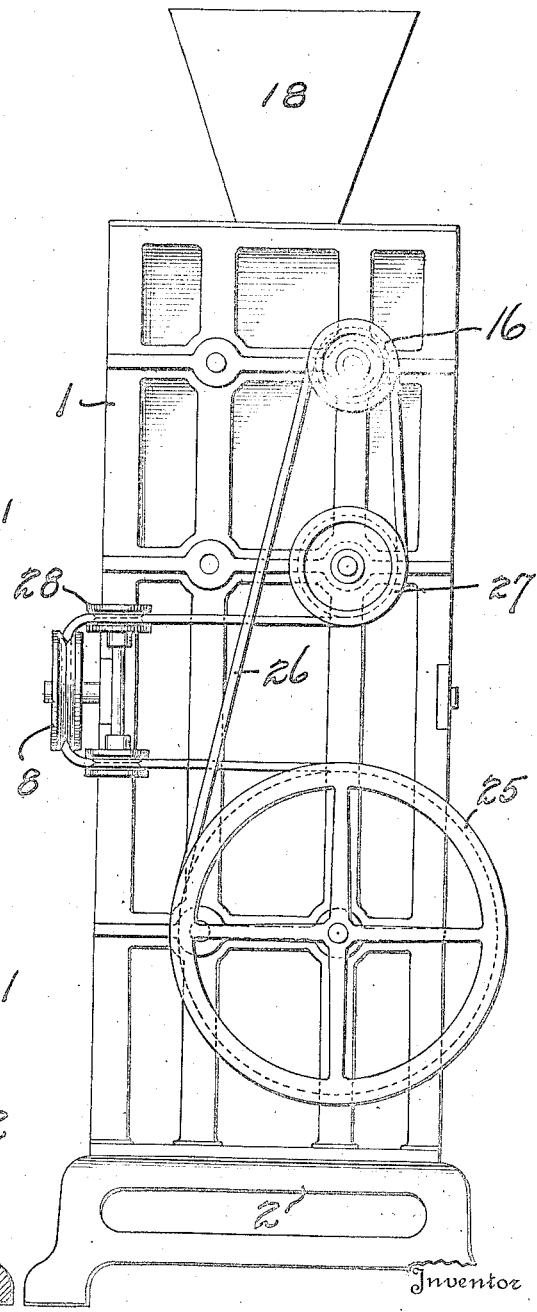

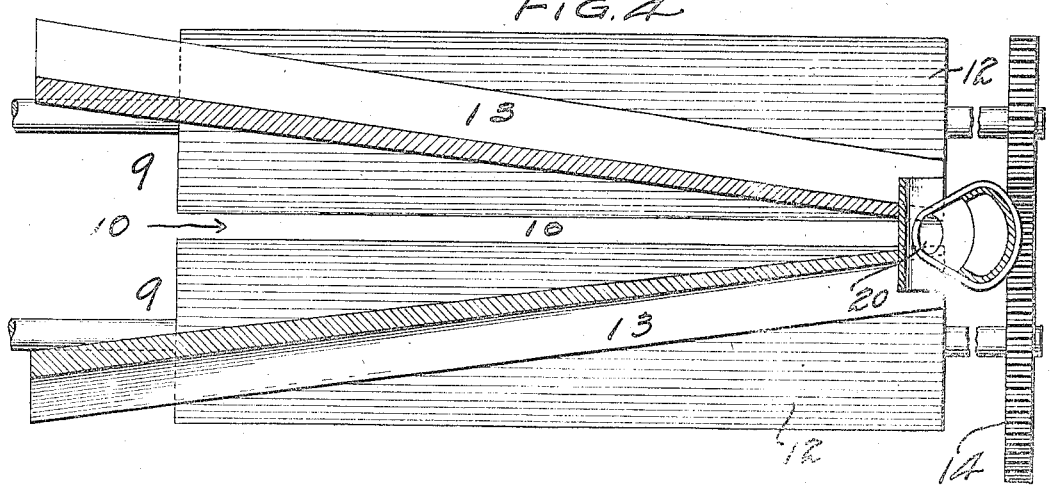
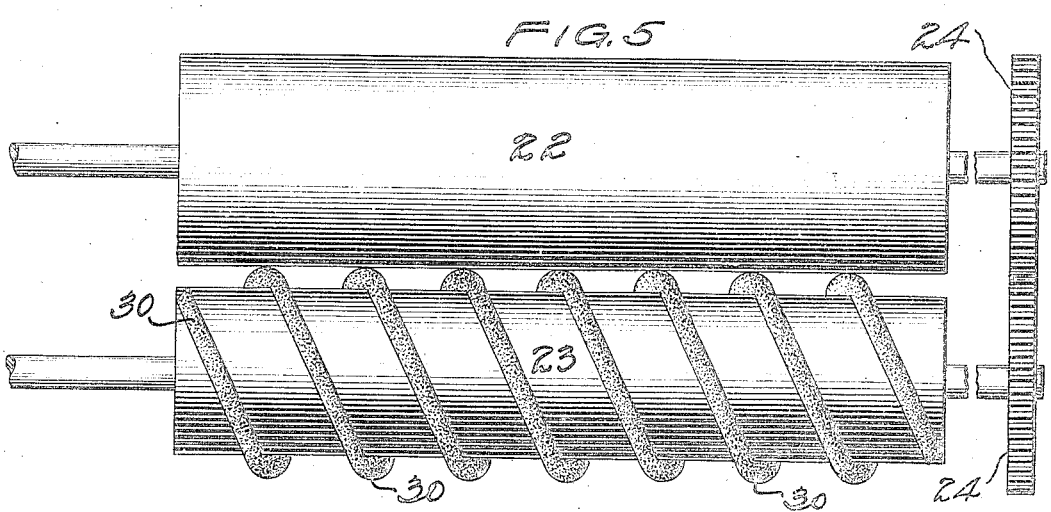
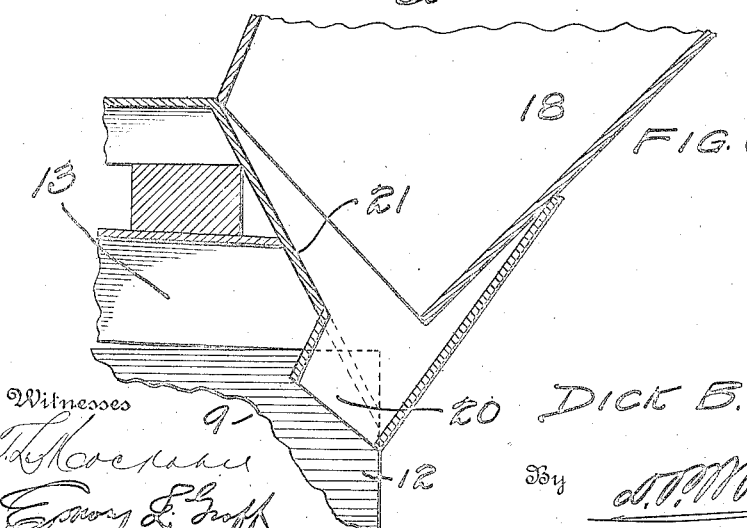

UNITED STATES PATENT OFFICE.

DICK B. WILLIAMS, OF NEW ORLEANS, LOUISIANA, ASSIGNOR TO LOUISIANA NUT AND PRODUCE COMPANY, OF NEW ORLEANS, LOUISIANA, A CORPORATION OF LOUISIANA.

NUT SHELLER AND SEPARATOR.

1,317,342.　　　　　　Specification of Letters Patent.　　Patented Sept. 30, 1919.

Application filed November 23, 1915. Serial No. 63,052.

*To all whom it may concern:*

Be it known that I, DICK B. WILLIAMS, a citizen of the United States, residing at New Orleans, in the parish of Orleans and State of Louisiana, have invented certain new and useful Improvements in Nut Shellers and Separators, of which the following is a specification.

This invention relates to machines for preparing food nuts, such as pecans and the like for the market, and has special reference to a novel shelling and separating device for previously cracked nuts.

Primarily, the invention has in view the removal of the shell particles from the nut meats so that the latter are delivered from the machine in substantially unbroken halves and separate from the shells, ready for weighing and packaging for the market. To this end, the invention contemplates a simple and practical mechanism for handling the previously cracked nuts, of the pecan variety, comprising means for loosening and picking the shell particles from the meats without injury to the latter, and then delivering the shell particles and nuts to a device whereby they are properly separated and the meats delivered from the machine.

Another object of the invention is to provide means for preliminarily loosening the shell particles from the nut meats before they are fed to the separating element, and also for discharging a nut, or portion of a nut, that is imperfectly cracked before the same can be delivered to said element. This insures only nut meats and relatively fine shell particles reaching the separating instrumentalities.

A further and distinctive object of the present invention resides in the provision of a novel and practical separating unit which insures a more perfect separating action by utilizing the rough and ragged characteristic of the shell particles as a means to assist in separating the same from the smoother meats, and thereby practically eliminating all of the shell particles from the meats before the latter are discharged from the machine. A further object in this connection is to employ an air blast in a novel manner as a part of the separating unit wherein a differential frictional effect is involved to provide for separating the roughened shell particles from the smoother meats.

With these and other objects in view which will more readily appear as the nature of the invention is better understood, the same consists in the novel construction, combination and arrangement of parts hereinafter more fully described, illustrated and claimed.

While the essential features of the invention are necessarily susceptible of a wide range of structural modification, within the scope of the appended claims, and without departing from the principle of the invention, a preferred and practical embodiment thereof is shown in the accompanying drawings, in which—

Fig. 2 is a vertical cross sectional view on the line 2—2 of Fig. 1.

Fig. 3 is an end elevation.

Fig. 4 is an enlarged detail plan view partly in section of the shelling unit.

Fig. 5 is an enlarged detail plan view of the separating unit.

Fig. 6 is an enlarged detail sectional view of the delivery end of the feed hopper.

Similar reference characters designate corresponding parts throughout the several figures of the drawings.

Figure 1:
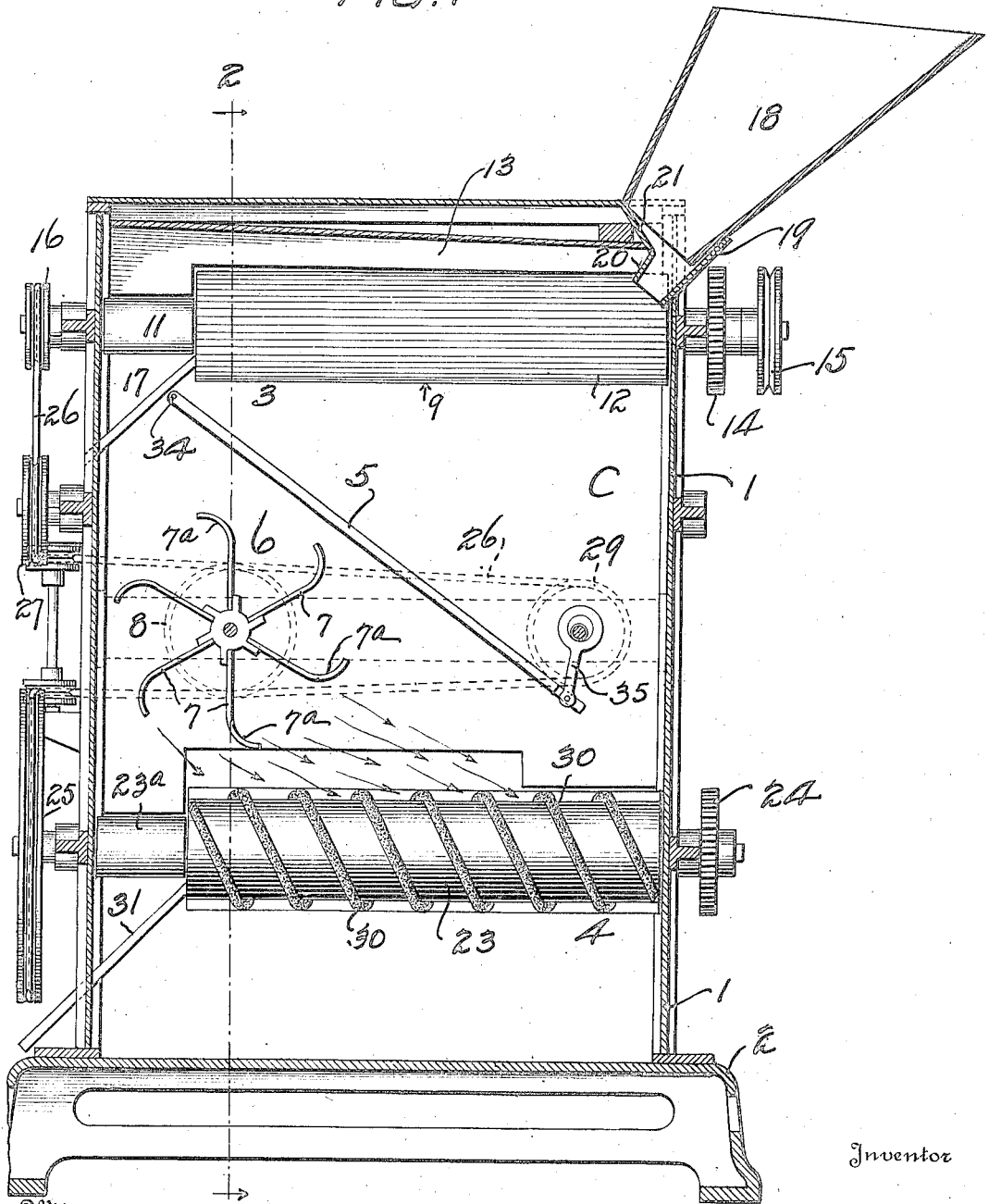
Figure 1 is a vertical sectional view of my improved nut sheller and separator.

The present invention comprises generally shelling and separating units having novel features of construction, and arranged in novel relation to a shellings-chute, and instrumentalities therein whereby a most effective picking and loosening of the shell particles from the meats is provided for, as well as means for effectually and cleanly separating and withdrawing the nut meats from the shell particles and nut dust. In this connection, it will be noted that the term "shellings" includes the nut meats and shell particles resulting from the action of the shelling unit and the supplementary devices within the chute which conducts or carries these articles to the main elements of the separator.

The various instrumentalities embodied in the present machine are supported and carried by and within an upright machine stand herein termed the casing member 1, mounted upon a base 2 of any desired form or height. To provide for the most effective and practical arrangement of parts, the shellings-chute designated generally by the reference letter C is supported in an upright position within the casing member 1.

Referring now to the novel arrangement of shell loosening devices it will be noted that there is located within the upper portion of the casing, at the top of the shellings-chute C, a shelling unit designated in its entirety by the reference 3, while at the bottom of the chamber there is located the main element of the separating unit 4 which is adapted to receive the "shellings," viz., shell particles and nut meats from the unit 3, after the same have been subjected to the action of an intermediate supplementary shell loosening and guiding device 5 within the chute C. A fan 6 is also arranged in the said chute C, the same including the blades 7 and being driven from a pulley wheel 8, as will hereinafter fully appear, the said fan constituting a part of the separating unit 4.

The shelling unit 3 above referred to preferably includes in its organization a pair of spaced parallel rolls 9 having therebetween a clearance space or interval 10, and provided at their discharge ends with reduced roll extremities 11. These rolls 9 are usually of duplicate construction and are provided with a peripheral shell picking covering 12, which is preferably of longitudinally ridged or ribbed rubber or equivalent cushioning material, and constitutes primary means for pulling or picking loose the shell pieces from the meats of the previously cracked nuts. Above the rolls 9, there is arranged a fixed feeding baffle hood 13 which forms a top cover for the said rolls and flares longitudinally toward the discharge end of the unit, thus forming a fixed sloping rebound or impact surface against which the nuts may be thrown by the rotating rolls 9, and advanced from the feed to the discharge end of said unit.

A further feature of practical importance in connection with the baffle hood 13 is that of arranging such hood at an inclination from the horizontal so that it slopes or inclines upwardly from the feeding end of the shelling unit toward the discharging end of such unit. By reason of this upward inclination of the baffle hood toward the discharging end of the shelling unit, a graduated rebound action is provided for. This action by reason of the arrangement described, gradually diminishes in intensity toward the discharging end of the unit as the impact walls become disposed at greater distances from the rolls, thus preventing injury to the meats which have already been freed or substantially freed from the shell particles clinging thereto.

In connection with the special relation between the rolls 9 of the shelling unit, it will be noted that the same are suitably journaled in the end walls of the casing 1 and are geared together as at 14, so that they rotate in opposite directions and at different speeds of rotation. Any suitable driving means may be employed to provide for this rotation, as, for instance, by fitting the spindle of one of these rolls with a driving pulley 15 which connects with a suitable source of power. These rolls in turn drive the rest of the apparatus through the medium of a pulley 16 on the end of the spindle of one of the rolls opposite the pulley 15 as will hereinafter appear. Furthermore, with regard to the novel relation of the rolls 9—9, it will be observed that the clearance space or interval 10 provided therebetween is located over the shellings-chute C, while the reduced discharge extremities 11 of these rolls are arranged over an inclined discharge spout 17. Thus, as the cracked nuts are fed into the shelling unit 3 from the feed hopper 18, it will be clear that they are rather sharply buffeted back and forth between the ribbed roll surfaces 12 and the impact walls of the baffle hood 13, thereby loosening the shells from the nut meats, and also directing the same from the feed end of the unit toward the discharging end thereof by reason of the horizontal flaring form of the hood as shown in Fig. 4 of the drawings.

As the shell particles are removed from the nut meats by the rolls 9—9, the shellings, that is the nut meats and small shell particles, some of the latter possibly still adhering to the nut meats, fall through the clearance space 10 between the rolls into the shellings-chute C, and onto the supplementary shell loosening device 5. In case an imperfectly cracked nut, or portion thereof, is not broken up into sufficiently small pieces to remove the meat from the shell by the combined action of the rolls and hood 13, this imperfectly cracked nut is carried to the reduced discharge extremities 11 of the rolls where it falls onto the discharge spout 17 and thence out of the machine to be rehandled.

As will be clearly observed from Fig. 1, the feed hopper 18 is suitably supported in the casing 1 so that the same is adapted to feed the previously cracked nuts contained therein in single order to the rolls 9 at the feeding end thereof. In connection with the novel features of this feed hopper 18, it will be noted that the same is provided with a discharge nozzle member 19 having a reduced outlet spout 20 which extends well down into the space between the rolls 9—9, to thus deliver the nut into such a position that it will be effectively engaged by the ribbed surfaces 12 of the rolls so that the action of the latter will commence at once on the entering nut. This discharge nozzle 19 is also provided with a guard wall 21 which prevents the nuts from being thrown backwardly after they are once placed between the rolls 9 and assists them in starting toward the discharge ends of the rolls. For the purpose of facilitating the feeding of the nuts from the hopper 18, and maintaining a uniform capacity of the machine, preferably all of the nuts placed in the said hopper are of substantially the same size. That is to say, they are preferably of the same or uniform grade so that they will freely pass from the hopper 18 through the discharge spout 20 and not become clogged or wedged therein.

At the bottom of the shellings-chute C, there is arranged the separating unit 4 previously referred to, which essentially includes in its embodiment a pair of separating roll elements 22 and 23 and a fan 6. In further reference to the fan 6, it will be observed that the same is preferably of a special construction, namely consisting of a plurality of radially arranged blades 7 which are substantially straight, and which are formed at their outer edges with air cupping spoons 7ª. The spoons 7ª of all of the blades 7 are curved or deflected in the same direction, and serve to cup the air in such a manner that the same is directed not only against, but longitudinally over, the upper sides of the rolls 22 and 23 to secure the novel effect presently referred to.

The said two rolls 22 and 23 are preferably arranged in parallel relation and in a horizontal position, and are geared together as at 24 so as to rotate in opposite directions and at the same peripheral rate of speed. Any suitable driving expedients may be utilized for driving these rolls, but in the illustrated embodiment the end of the spindle of the roll 23 opposite the gears 24 preferably carries a pulley 25 which is adapted to receive a belt connection 26 which leads to the pulley 16 on one of the rolls of the shelling unit. This belt connection 26 after passing around the pulley 16 engages an idle pulley 27, and from thence passes by means of a pulley 28 to the pulley 29 associated with the supplemental shell loosening device. However, before the said belt 26 reaches the pulley 29, it engages with the pulley 8 of the fan device 6, thus operating the latter in the direction of the arrow in Fig. 1, and causing a blast of air to sweep over the rolls 22 and 23 of the separating unit.

The roll 22 of the separating unit has a smooth non-frictional surface which meets the periphery of the spiral flight 30 on the roll 23. This spiral flight 30 is preferably of a material such as a textile cord or rope which will present a frictional surface for engagement with the roughened and ragged edges of the shell particles, and is so wound around the body of the roll 23 as to form a conveyer for advancing the select meats toward the discharging end of the rolls. Thus, it will be clear that the fan device 6 which constitutes a part of the separating unit 4 is adapted to produce a blast of air which sweeps over and against the rolls 22 and 23 opposite to the direction of feed of the conveyer flight 30, thus assisting in holding by air pressure, the shell particles to the frictional flight 30. As these rolls rotate in opposite directions, it will be clear that the shell particles and nut meats, falling from the shelling unit 3 and supplementary shell loosening and guiding device 5, will drop onto the rolls 22 and 23, and the select nut meats will be conveyed by the flight 30 toward the reduced discharge extremities 23ª of the said rolls, because of their smoothness as distinguished from the roughened shell particles. That is to say, the nut meats will be advanced toward the discharge extremities of the rolls and be delivered from the apparatus through the discharge spout 31, because they will be riding against the surface of the smooth roll 22 and advanced by the conveyer flight 30, while the blast of air from the fan device 6 causes the roughened shell particles to cling to the frictional flight 30 of the roll 23, which, because rotating in a direction opposite to the roll 22, will remove the shell particles from the valley between the rolls and throw the same outside of the casing, as clearly apparent from Fig. 2.

The shellings which pass through the discharging space end between the rolls 9—9 enter the upper end of the chute C, and fall upon the deflecting device 5 which has previously been referred to as a supplementary shell loosening device. As indicated, this not only functions as a guiding board for driving all of the shellings toward the receiving end of the separating unit, but also assists by gentle action in maintaining the meats and shell pieces in a thoroughly loosened condition. Referring more particularly to the device 5, the same comprises a flat board element $a$ pivoted as at 34 adjacent the discharge end of the shelling unit 3, but within the chamber C, and in such a position that it readily receives all of the nut meats and shell particles from the rolls 9 which fall through the clearance space 10 therebetween. For the purpose of giving this member $a$ a vibratory movement to assist in further loosening the nut meats from the shell particles, the same is provided at its end adjacent the pivot 34 with an eccentric connection 35 with the pulley 29. The said member $a$ is disposed diagonally of the shellings-chute C, to provide an inclined surface for delivering all of the nut meats and shell particles that are of a proper size to clear the space 10 between the rolls 9 from the discharge end of the shelling unit 3 toward the feed end of the separating unit 4, thus insuring all of the nut meats and shell particles obtaining the full benefit of the separating action of the rolls 22 and 23, and the air blast produced by the fan device 6.

In the practical operation of the machine, the select nut meats are carried along by the conveying action in the separating rolls to a point of discharge 31 where they are recovered in a suitable receptacle while broken particles of meat and some particles of shell and other debris will pass between the rolls 22 and 23 onto the floor of a suitable receptacle 32 therefor. At the same time, the main and larger shell particles, which are held in frictional engagement with the conveyer flight will be discharged by the latter outside of the machine over a suitable guiding element or deflector, as indicated at 33 in Fig. 2 of the drawings. In this connection, it will be observed by reference to the said figure of the drawings that the two rolls of the separating unit have their outer portions projecting beyond the walls of the shellings-chute C, and hence outside of the influence of the air blast therein.

From the foregoing description, it is thought that the many features and advantages of the present invention will be readily apparent, and it will also be understood that changes in the form, proportion and minor details of construction may be resorted to without departing from the spirit of the invention or scope of the appended claims.

I claim:

1. A nut sheller and separator including an upright chute, a pair of rolls arranged at and forming the top of said chute and having shell picking means, and a pair of rolls arranged at and forming the bottom closure for said chute, the latter rolls having means for separating the nut meats from the shell particles.

2. A nut sheller and separator, including in combination an upright chute, a pair of rolls arranged to form the top of said chute and having shell picking means, a pair of rolls arranged to form the bottom closure for the chute and having means for separating the nut meats from the shell particles, a supplementary loosening and guiding device arranged inside of the chute between the top and bottom pair of rolls, and an air blast device arranged to coöperate with the bottom pair of rolls to assist in maintaining the separation between the nut meats and the shell particles.

3. A nut sheller and separator including a shelling unit consisting of a pair of spaced rolls having cushion coverings thereon, and a fixed impact surface overlying said rolls.

4. A nut sheller and separator including a shelling unit consisting of a pair of spaced rolls having cushion rebound coverings provided with projections, and a fixed rebound impact surface overlying the rolls.

5. A nut sheller and separator including a shelling unit consisting of a pair of spaced rolls carrying shell-picking means, and a fixed rebound impact surface overlying the rolls and inclining upwardly therefrom toward their discharging ends.

6. A nut sheller and separator including a shelling unit consisting of a pair of horizontal spaced rolls carrying shell-picking means, and a longitudinally flared rebound impact member overlying the rolls, said impact member inclining upwardly from the rolls toward their discharging ends.

7. A nut sheller and separator including, in combination with shelling means, a separating unit consisting of a pair of rotating rolls, one of said rolls having a smooth non-frictional surface throughout and the other of said rolls having a shell engaging and holding frictional conveyer flight operating in contact with said non-frictional surface of the adjacent roll, means for causing the shell particles to be held against the frictional flight while moving away from the smooth roll.

8. A nut sheller and separator including, in combination with shelling means, a separating unit consisting of a pair of rolls, one of said rolls having a smooth surface and the other having a frictional conveyer flight thereon, and an air blast device arranged to direct an air blast against the frictional flight.

9. A nut sheller and separator including, in combination with shelling means, a separating unit consisting of a casing, a pair of rolls, one of said rolls having a smooth non-frictional surface and the other of said rolls having a frictional conveyer flight adapted to operate within and without the casing, and an air blast device arranged to direct an air blast against said flight within the casing to temporarily hold shell particles there-against.

In testimony whereof I hereunto affix my signature in the presence of two witnesses.

DICK B. WILLIAMS.

Witnesses:
L. P. O'Dowd,
M. Eagan.